(No Model.)
W. P. O'CONNOR.
HAT VENTILATOR.
No. 482,429. Patented Sept. 13, 1892.
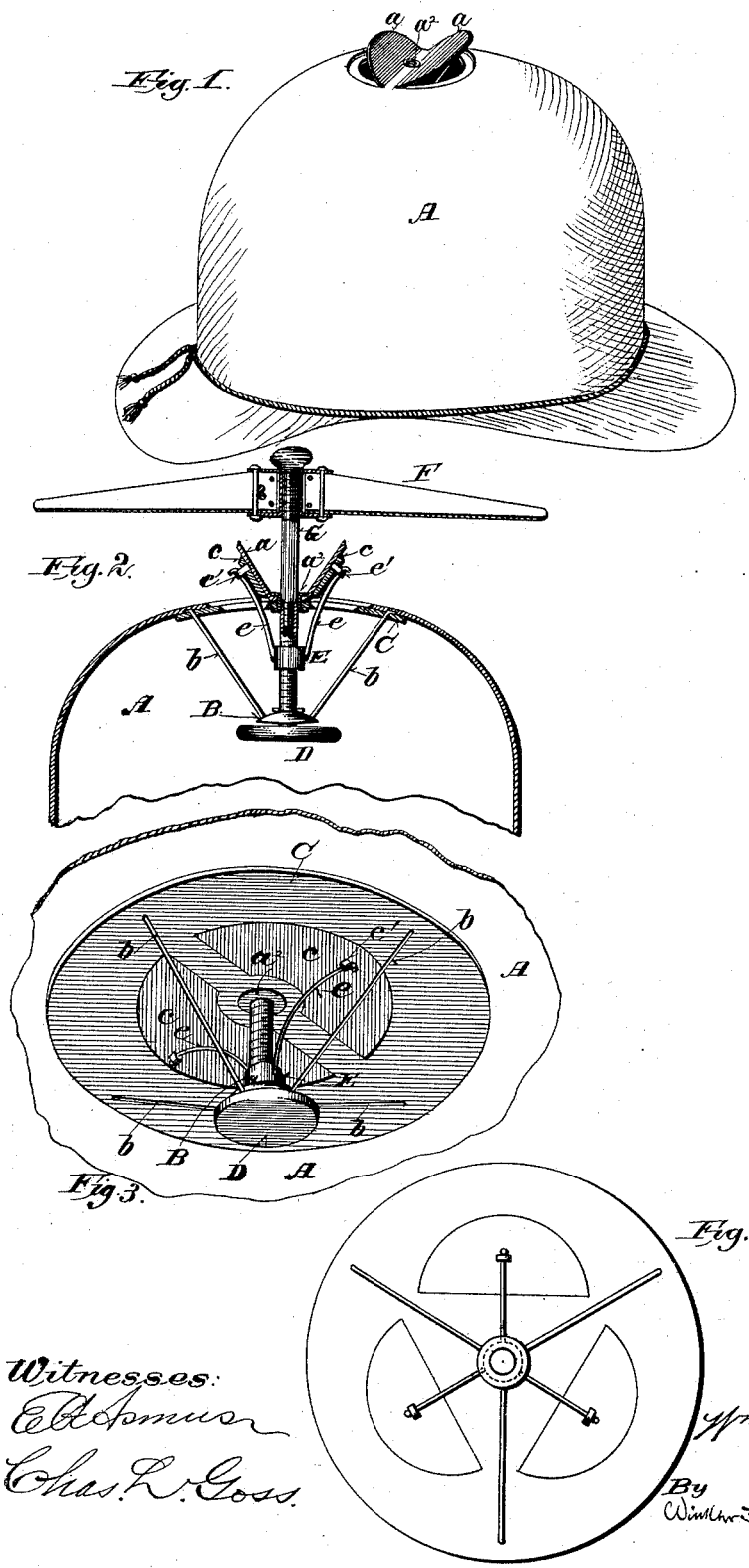
Witnesses:
E. A. Asmus
Chas. L. Goss
Inventor:
Wm. P. O'Connor,
By Winthrop Flanders Smith Bothum & Vilas
Attorneys.

UNITED STATES PATENT OFFICE.

WILLIAM P. O'CONNOR, OF MILWAUKEE, WISCONSIN.

HAT-VENTILATOR.

SPECIFICATION forming part of Letters Patent No. 482,429, dated September 13, 1892.

Application filed May 25, 1889. Serial No. 312,044. (No model.)

*To all whom it may concern:*

Be it known that I, WILLIAM P. O'CONNOR, of Milwaukee, in the county of Milwaukee and State of Wisconsin, have invented certain new and useful Improvements in Hat-Ventilators; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to ventilate the interior of the hat-crown when placed on the head.

It consists, essentially, of one or more sections or leaves hinged to the crown of the hat, so as to open outwardly together, with means for opening, closing, and adjusting the same, and of certain other peculiarities of construction and arrangement hereinafter particularly described, and pointed out in the claims.

In the accompanying drawings like letters designate the same parts in the several figures.

Figure 1 is a perspective view of a hat or helmet to which my improved ventilator is applied. Fig. 2 is a vertical medial section of a portion of the crown of the hat provided with my improved ventilator. Fig. 3 is a perspective view, on an enlarged scale, of the under side of the ventilator; and Fig. 4 is a view of the under side of a modified form of the ventilator.

Referring to Figs. 1, 2, and 3 of the drawings, A represents an ordinary stiff hat or helmet in the top of the crown of which are made semicircular incisions forming the leaves $a\ a$. The crown of the hat and the leaves $a\ a$ are reinforced inside by a disk C of pasteboard or other suitable stiffening material, from which are cut sections $c\ c$, corresponding in shape but a little smaller than the leaves $a\ a$, to which they are attached. In the disk C are secured the upper ends of arms $b\ b$, which converge downwardly and are attached to a ring or sleeve B, forming the bearing for an adjusting-screw D, which has a bearing at its upper end in an eyelet $a^2$, inserted in the center of the crown and of the disk C. Upon the screw D is placed an internally-threaded sleeve or nut E, provided with the upwardly-projecting and diverging arms $e\ e$, which are inserted at their upper ends through staples or loops $e'\ e'$, attached to the under side of the leaves $a\ a$, as shown in Figs. 2 and 3. The incisions by which the leaves $a\ a$ and the reinforcing-sections $c\ c$ are formed are made obliquely, so as to give to the edges of said leaves and sections and the edges of the openings from which they are taken beveled edges, as shown in Fig. 2. This provision insures a close joint when the leaves $a\ a$ of the ventilator are closed.

In place of two leaves or sections I may form the ventilator with three or more sections in the manner shown in Fig. 4 or may employ only one section. I prefer, however, two sections or leaves, as shown in Figs. 1 and 2. The disk C not only reinforces the material of the hat about the edges of the openings from which the leaves $a\ a$ are cut, but, projecting inwardly past the edges of said openings, furnishes a seat against which the edges of the leaves $a\ a$ are closed. By turning the screw D in the proper direction the leaves $a\ a$ may be opened, closed, and set at an angle, so as to afford greater or less openings into the crown of the hat, as desired. When the leaves $a\ a$ are open, the one on the windward side serves as a deflector and directs the air striking its lower inclined surface into the crown of the hat, while that on the leeward side shields the opening through which the air within the hat escapes.

In connection with Fig. 2 I show a detachable folding shade F, supported upon a vertical stem G, which is inserted and held in an eyelet $a^2$ in the top of the hat-crown. While this device may be conveniently used in connection with my ventilator, it is not essential thereto, and I make no claim therefor in this application.

I claim—

1. The combination, with a hat, of a ventilator consisting of two or more oppositely and outwardly opening leaves, each cut from and hinged at one side in an opening in the crown and adapted to be closed flush therewith, a disk or flange attached to the inside of the crown, projecting inside of the edges of said opening to constitute a seat for said sections or leaves, and means for holding said sections or leaves open more or less, as desired, said leaves serving, when open, as deflectors to direct air into and permit its unobstructed passage out of the hat, substantially as and for the purposes set forth.

2. The combination, with a hat, of a ventilator consisting of two or more outwardly-opening leaves cut from and hinged in the crown of the hat, a reinforcing-disk attached to the inside of the crown and projecting inside of the edges of the openings in the crown and serving as a seat for said leaves when they are closed, and one or more sections cut from said disk corresponding with and a little smaller than said leaves to which they are attached, and means for holding said leaves open more or less, as desired, substantially as and for the purposes set forth.

3. The combination, with a hat, of a ventilator consisting of one or more leaves hinged in an opening or openings formed in the crown, so as to open outwardly, an adjusting-screw having a suitable bearing attached to the inside of the crown, and a nut with which said screw engages, provided with an arm or arms connected with said leaf or leaves, so as to open and close the same by the turning of said screw in opposite directions, substantially as and for the purposes set forth.

In testimony that I claim the foregoing as my own I affix my signature in presence of two witnesses.

WILLIAM P. O'CONNOR.

Witnesses:
CHAS. L. GOSS,
JOHN HURLEY.